United States Patent Office 2,863,902
Patented Dec. 9, 1958

2,863,902

PREPARATION OF PHOSPHATE ESTERS

William Santay, Irvington, N. J., assignor to American Cyanamid Company, New York, N. Y., a corporation of Maine No Drawing. Application September 8, 1954
Serial No. 454,830

8 Claims. (Cl. 260—461)

The present invention relates to improved methods for the preparation of phosphate esters, particularly those which conform to the general formula:

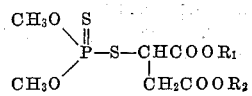

where $R_1$ and $R_2$ are aliphatic or aromatic hydrocarbon radicals. In the above formula, the R's may be the same or different radicals, and when they represent aliphatic radicals, it is to be understood that they represent both the straight chain and branch chain, the saturated and unsaturated, and the aliphatic hydrocarbon radicals. Illustrative radicals are methyl, ethyl, n-propyl, isopropyl, n-butyl, sec.-butyl, sec.-amyl, N-hexyl, 2-ethyl-hexyl, N-octyl, N-decyl, N-dodecyl, oleyl, cetyl, allyl, cyclohexyl, phenyl and naphthyl.

The organic phosphates as defined possess utility in many varied fields, such as in the formulation of insecticides, fungicides, plasticizers, corrosion inhibitors, flotation agents and petroleum additives. These properties create a marked potential economic demand.

Previously, phosphate esters have been prepared by Cassady in U. S. Patent No. 2,578,652, assigned to the American Cyanamide Company. The process described therein is directed to the reaction of O,O-dimethyl dithiophosphoric acid and an unsaturated compound of the formula:

$$\begin{array}{c}\text{CHCOOR}_1\\\parallel\\\text{CHCOOR}_2\end{array}$$

in which $R_1$ and $R_2$ have the same meaning as above. The O,O-dimethyl dithiophosphoric acid can be prepared by conventional methods. While its preparation has not been described in the aforementioned patent, one of the known processes has been reported by Malatesta, Gazz. Chim. Ital., 81, 596–608 (1956). That process describes the reaction of anhydrous methanol with phosphorus pentasulphide to obtain O,O-dimethyl dithiophosphoric acid in yields of about 32 percent. Hence, O,O-dimethyl dithiophosphoric acid is prepared initially and is recovered in relatively poor yields. Thereafter, the acid is separated from sundry impurities and is then reacted with an olefinic ester to obtain a phosphate ester. Recovery of a phosphate ester thus involves a two-step process which is not wholly economical due to the initial low yield recovery of O,O-dimethyldithiophosphoric acid and to the necessity for the provision of separatory equipment in recovering the acid for further reaction. These prior reactions may be summarized briefly as follows:

(A)

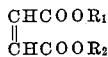

$4CH_3OH + P_2S_5 \longrightarrow$ (B)

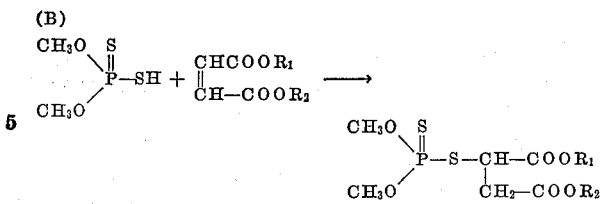

wherein $R_1$ and $R_2$ have the meanings noted above.

It had been previously assumed that a two-step process as summarized was essential for many reasons. The presence of hydrogen sulfide in step (A) militates against the simultaneous use of unsaturated compounds, phosphorus pentasulfide and methanol because it is known that hydrogen sulphide formed in step (A) will saturate an active double bond of unsaturated compounds. Additionally, phosphorus pentasulphide in the presence of an unsaturated ester affects the carbonyl grouping of the latter as well as adding to olefins. A still further reason for assuming that steps (A) and (B) could not be combined is the probability of ester interchange between mehanol and the unsaturated ester. However, the most militating factor against combining steps (A) and (B) is the fact that step (A) alone produces merely a 32 percent yield of O,O-dimethyl dithiophosphoric acid, as reported by Malatesta above. Thus, commercially-feasible yields of phosphate esters, i. e., eighty (80) percent or better, would not be expected to be obtainable by a direct one-step synthesis involving reactants: methanol, phosphorus pentasulfide and unsaturated ester as defined above because the reaction between O,O-dimethyl dithiophosphoric acid and the unsaturated ester is substantially equimolar as shown in step (B).

Nevertheless, in order to simplify the operational procedures it is the principal object of the present invention to prepare the phosphate esters of the present invention utilizing a direct single-step process.

It is a further object of the present invention to prepare phosphate esters in a direct synthesis in order to obtain commercially-feasible and excellent yields of phosphate ester in a state of high purity.

It is a still further object to prepare phosphate esters in readily available equipment.

It would appear from a study of the above-mentioned earlier work that the accomplishment of these objects is impractical, if not impossible. Recent publications have also suggested this. However, the procedure as developed by the present invention controverts all such predictions and is not only wholly practical but simple in use.

In general, objects of the present invention are surprisingly accomplished by bringing into direct reactive combination methyl alcohol, phosphorus pentasulphide and an unsaturated ester, such as a maleate or fumarate to form a phosphate ester of high purity and excellent yields. The over-all reaction may be represented as follows:

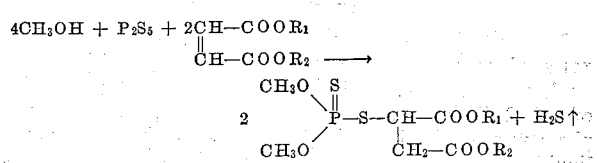

wherein $R_1$ and $R_2$ have the meanings indicated above.

In outlining the successful operation of the process of the present invention, the order of addition of reactants, proportions of reactants and temperature requirements should be considered. Any order of addition of reactants is feasible. For example, simultaneous admixture of methanol, phosphorus pentasulphide and the unsaturated ester is satisfactory, provided the reaction temperature is maintained at about 100° C. or lower, due to the highly exothermic nature of the reaction mixture. It is preferred, however, either to slurry phosphorus pentasulphide in the unsaturated ester and then add methanol thereto, or in the alternative to admix methanol and the unsaturated ester and then introduce phosphorus pentasulphide into the mixture. By so proceeding through either alternative route, the reaction can be more easily controlled. The reaction may be conducted either batchwise or continuously.

The temperature of the reaction mixture should be maintained within the range from about 20° C. to about 100° C., and preferably between about 65° C. and about 85° C. At temperatures below 20° C. the reaction is too slow for dithiophosphoric acid addition to be practical. Temperatures in excess of about 100° C. should be avoided in order to prevent decomposition of dithiophosphoric acid formed during the reaction.

As noted previously, four mols of methanol, one mol of phosphorus pentasulphide and two mols of unsaturated ester are reacted to yield two mols of desired phosphorus ester and one mol of hydrogen sulphide. However, almost quantitative yields may be had by employing an excess of methanol, preferably up to 4.5 moles, as well as a lesser quantity of unsaturated ester, preferably as low as 1.5 mol per mol of phosphorus pentasulfide.

The invention will be further illustrated by the following examples, but it is not to be construed as being limited thereto. Unless otherwie noted, the parts given are by weight.

Example 1

Two mols of phosphorus pentasulphide (445 parts) were slurried in 3.24 mols of diethyl maleate (558 parts) contained in a glass reaction vessel equipped with a stirrer, reflux condenser and dropping funnel. The slurry was then heated to about 60° C. 260 parts of methanol (8.12 mols) were then added to the slurry over a period of about one hour while maintaining the temperature from 65°–70° C. After all the methanol had been added, the reaction mixture was heated for an additional four hours at 80° C.–88° C. so as to complete the reaction. During reaction, hydrogen sulphide is removed and collected in a trap containing a sodium hydroxide solution.

The reaction mixture is removed from the vessel and washed with a ten (10) percent soda ash solution, followed by a water wash, and finally stripped to 70° C. under a vacuum of 20–25 mm. to dry the product. The final product, S-(1,2-dicarbethoxyethyl) O,O-dimethyl dithiophosphate, analyzed 95% pure and was obtained in yields of 97.4% based upon the weight of the diethyl maleate reactant.

Example 2

The procedure of Example 1 was repeated, using 460 parts of dimethyl maleate (3.2 mols) in place of diethyl maleate of Example 1. The purity of the final product, S-(1,2 dicarbomethoxyethyl) O,O-dimethyl diethiophosphate, as well as the yield based on the maleate employed, was substantially the same as in the previous example.

Example 3

The procedure of Example 1 was employed, using 445 parts of phosphorus pentasulphide, 260 parts of methanol, and 850 parts of diphenyl fumarate. A 91% yield of S-(1,2 dicarbophenoxyethyl) O,O-dimethyl dithiophosphate was obtained. This product was a viscous brown liquid.

Example 4

To a mixture of 71 parts of methanol and 142 parts of diethyl maleate was added 111 parts of phosphorus pentasulphide in a reaction vessel equipped with a mechanical stirrer, reflux condenser, and dropping funnel. The phosphorus pentasulphide was added to the mixture over a pehiod of two hours while maintaining the mixture mechanically agitated at a temperature of 65° C. The reaction was heated for an additional 2 hours after all the phosphorus pentasulphide was added in order to insure complete reaction. During this time hydrogen sulphide was removed from the reaction vessel. The mixture is then cooled to 35° C. and is filtered to remove unreacted phosphorous pentasulphide. The organic residue was washed with 600 parts of ten (10) percent soda ash and then with 600 parts of water. The liquid product, S-(1,2-dicarbethoxyethyl) O,O-dimethyl dithiophosphate, is then stripped from residual water by passing it through a spiral condenser heated by steam in the jacket and under 5 mm. of mercury pressure to remove water. The yield of product is 86.5% based upon the amount of diethyl maleate employed. The purity of the product is greater than 90%.

Example 5

For conducting the process continuously, a three-liter glass resin flask is divided horizontally into four sections by means of three circular Teflon (polyfluoroethylene) sheets. Each sheet is provided with holes for a stirrer and delivery tubes. The tubes extended to the bottom of the reaction chamber. The Teflon sheets are separated by means of hollow glass spacers encircling the delivery tubes. The reaction mixture comprising methanol, phosphorus pentasulfide, and diethyl maleate are agitated with a stirrer equipped with three impeller blades so situated on the shaft that one blade is located in each section. Slits in the Teflon sheets are also provided so that the reactants slowly overflow from the bottom or lower section to the top section before removal through an exit tube. This exit tube is connected to a washing flask under a slight vacuum. The product was continuously washed with alkali carbonate and the two layers separated by centrifugation. The entire reaction vessel is fitted with a glass cover having openings for the stirrer, inlet tubes, exit tubes, and reflux condenser. The top of the reflux condenser is further attached to a hydrogen sulfide scrubber comprising a solution of sodium hydroxide.

In actual operation, phosphorus pentasulfide is ground in a colloid mill under carbon dioxide vapor and slurried with diethyl maleate in the ratio of 1 part to 1.275 parts, respectively. This thick slurry is pumped into the bottom chamber of the continuous reactor at a rate of 25.6 parts of slurry per minute by means of a Sigma feed pump. Through another inlet tube to the bottom reaction chamber methanol was pumped at a rate of 7.12 parts per minute. The feed rates are so adjusted that the total residence time in the reactor is not more than two hours. The reaction is maintained at 70°–75° C.

Material that emerged from the exit tube contained 73.3% S-(1,2-dicarbethoxyethyl) O.O-dimethyl dithiophosphate, 10.4% O,O-dimethyl dithiophosphoric, acid, 7.89% diethyl fumarate and 8% neutral by-product, thiophosphate esters. This corresponds to a yield of 81% desired product and an 83% conversion of diethyl maleate. The product stream is washed with 0.5 part of 10% sodium carbonate solution per part of product after centrifugation, 1 part of washed product stream was washed with 0.5 part of water and again separated by centrifugation. The organic stream is then continuously steam-stripped to yield a product of 95% purity.

I claim:

1. A method of preparing a phosphate ester of the general formula:

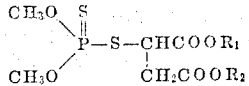

in which $R_1$ and $R_2$ are selected from the group consisting of aliphatic hydrocarbon and aromatic hydrocarbon radicals which comprises: bringing into reactive combination phosphorus pentasulfide, methyl alcohol and an unsaturated compound of the general formula:

$$\begin{array}{c} CHCOOR_1 \\ \parallel \\ CHCOOR_2 \end{array}$$

in which $R_1$ and $R_2$ are selected from the group consisting of aliphatic hydrocarbon and aromatic hydrocarbon radicals, maintaining the reaction mixture at a temperature of from about 20° to about 100° C. until reaction substantially ceases, and recovering said phosphate ester.

2. A method according to claim 1 wherein from 4 to 4.5 mols of methyl alcohol and from 1.5 to 2 mols of unsaturated ester per mol of phosphorus pentasulphide are employed.

3. A method according to claim 1 wherein phosphorus pentasulfide is slurried in the unsaturated compound prior to reaction.

4. A method according to claim 1 wherein phosphorus pentasulfide is added to a mixture consisting of methyl alcohol and the unsaturated compound.

5. A method according to claim 1 wherein the process is conducted continuously.

6. A method according to claim 1 wherein the unsaturated compound is dimethyl maleate.

7. A method according to claim 1 wherein the unsaturated compound is diethyl maleate.

8. A method according to claim 1 wherein the unsaturated compound is diphenyl maleate.

References Cited in the file of this patent

UNITED STATES PATENTS

| | | |
|---|---|---|
| 1,893,018 | Christmann | Jan. 1, 1933 |
| 2,578,652 | Cassaday | Dec. 18, 1951 |

OTHER REFERENCES

Malatesta et al., Gazz. Chim. Ital. 81 (1951) 596–608.